United States Patent [19]
Ontkean

[11] Patent Number: 5,853,634
[45] Date of Patent: Dec. 29, 1998

[54] METHOD OF FORMING LIGHT WEIGHT CONSTRUCTION SHEET GOODS FROM RECYCLABLE MATERIAL

[76] Inventor: Orville M. Ontkean, 40397 Calle Medusa, Temecula, Calif. 92591

[21] Appl. No.: 910,689

[22] Filed: Aug. 13, 1997

[51] Int. Cl.⁶ ...................................................... B28B 1/26
[52] U.S. Cl. ............................. 264/86; 264/87; 162/147; 162/169; 162/181.6
[58] Field of Search ........................ 264/86, 87; 162/147, 162/169, 181.6

[56] References Cited

U.S. PATENT DOCUMENTS

| | | | |
|---|---|---|---|
| 3,623,938 | 11/1971 | Jenkins | 162/147 |
| 3,701,672 | 10/1972 | Ruff et al. | 162/147 |
| 4,963,603 | 10/1990 | Felegi et al. | 162/147 |

*Primary Examiner*—James Derrington
*Attorney, Agent, or Firm*—Marger Johnson & McCollom PC

[57] ABSTRACT

A building material and a method for its manufacture is provided wherein cellulosic, polymeric and acid wastes are treated and combined to produce a building panel which demonstrates low weight, high strength and good fire resistance.

12 Claims, No Drawings

METHOD OF FORMING LIGHT WEIGHT CONSTRUCTION SHEET GOODS FROM RECYCLABLE MATERIAL

BACKGROUND OF THE INVENTION

This invention is directed toward a light weight construction panel, and in particular toward a construction panel which is fabricated using recyclable or discarded materials from industry, commerce, and residential communities.

The standard gypsum drywall panel, also known as sheetrock, is widely used to form walls in modern residential and commercial buildings. Sheetrock is manufactured by compressing a relatively heavy, gypsum-containing material between layers of paper or cardboard. It is then attached by being nailed or screwed to wood or metal studs to form walls. The seams of adjacent panels are taped, spackled and sanded to provide an even finished appearance. Although the standard sheetrock panel has come to be accepted in the building industry, it is rather heavy and relatively fragile.

SUMMARY OF THE INVENTION

This invention is embodied in a building panel and a method for making a building panel which provides an improved alternative to the standard sheetrock panel. The building panel and methods of this invention also provide an opportunity to recycle cellulosic, polymeric and acidic waste materials into a stable, safe and valuable building product, reducing the need to otherwise dispose of or treat the waste materials.

DETAILED DESCRIPTION OF THE INVENTION

In one example, I first combine 40 volumes of acid-treated pulp with 15 volumes of plain, macerated pulp. The macerated pulp used in this example is macerated newsprint, although other cellulosic materials could be used as well. The macerated pulp is washed in water, then heated and drained to remove the ink and solubles, thereby producing a drained, thick pulp. To the drained, thick pulp is added a 22–33% sulfuric acid solution. Used battery acid is suitable for this step, as are commercially available sulfuric acids. The resulting solution is heated to about 140–150 degrees F. for 10–20 minutes. The pulp is then drained again and washed with water, preferably two or more times. To the combined pulp mixture is added enough water to form a loose, pourable mixture. 30 volumes of pearlite powder is added to the mixture, along with enough additional water to maintain a loose, pourable mixture. This mixture is then drained and repulped with fresh water until the resulting pulp mixture is preferably at a pH of between about 5 and 7, and more preferably about 6.0.

The mixture is then adjusted to a pH of about 6.5 using ammonia or other basic solution. The excess water is then drained so that a loose mixture is retained. ¾ volume of macerated carpet fibers are then added to the pulp, and the mixture is then allowed to sit for 10 to 20 minutes. I have found that the addition of ⅛ to ⅜" long carpet cuttings of nylon, polyester, acrylics or other olefin materials improve the strength of the panel. A soap solution is prepared from one volume of oleic acid in warm water to which is added enough ammonia to produce an emulsion. The soap emulsion is added with mixing to the pulp mixture, which is again allowed to sit for 10 to 20 minutes. A solution of ½ volume of aluminum sulfate and 1 volume of magnesium sulfate is added to the pulp with mixing, and the mixture allowed to stand for 10–20 minutes. To the pulp mixture is added 35 volumes of polystyrene grindings (made from polystyrene packaging, containers and the like) with sufficient additional water to maintain a loose mixture. To this mixture is added, with slow mixing, 70 volumes of expanded silicate particles. The expanded silicate particles are preferably sized between ⅛ and ³⁄₁₆", although somewhat larger or smaller particles may be substituted. In one example, the expanded silicates are produced by preparing a solution of 40 or 45% sodium silicates solids, e.g. commercial water glass, in water. The solution is dried to form glass-like pieces which are then broken and coarse-ground to about –⅛" in size. The particles are then heated to between 200 and 800 degrees F., causing them to expand between 5–20 times their original volume. The invention is not intended to be limited in this step to an upper temperature of 800 degrees F.

In an alternative embodiment, the sodium silicate solution is evaporated to about 10–20% water content. About 10% by volume of a powdered sulfate of magnesium, manganese, copper or aluminum is then added to the sodium silicate prior to heating and expanding. I have found that the addition of metal sulfates to the sodium silicate in this manner increases the moisture resistance of the finished panel.

After drying, the expanded silicate, with or with out the addition of metal sulfates, is added to the pulp mixture. The pH of the pulp mixture is adjusted to about 7–7.5 using vinegar, or another dilute aqueous acidic mixture. The mixture is then drained and washed three times with clear water, drained to a semi-dry mass, and then allowed to set. A separate mixture is then prepared by dissolving about 30 grams of polystyrene in about 15–20 20 mls. of methyl ethyl ketone, lacquer solvent, or xylenol solvent. To this mixture is added about 1 and ⅓ volumes of chlorowax 70, a fire retardant produced by Diamond Alkali Co. (or other equivalent fire retardant). About 60 volumes of pearlite is then added, and the mixture gently mixed only until the free liquid is absorbed. The polystyrene pearlite mixture is then added to the pulp mixture with just sufficient water to produce a mixable mass. The mixture is blended briefly, and then poured into a paper-lined cavity mold. The cavity mold is sealed and a pressure of 40–50 p.s.i. is applied for between sixty and ninety minutes. The slab is then removed from the mold and dried at between 170 and 190 degrees F. for three to four hours.

In the foregoing example, a "volume" equals 9.5–10 mls., and the resulting mixture filled a cavity mold 6.25" by 9.25" by 0.5". The resulting panel is 6" by 9" by 0.5", and weighed between 5.5 and 5.75 oz. A 4'×8' panel formed of the same material would weigh about 27–28 pounds, representing a significant weight savings over conventional sheetrock. A panel according to the present invention also demonstrates higher resistance to breaking than standard sheetrock, equally good or better nail pull-out resistance, is readily cut or sawed, resists water uptake, and demonstrates little or no flame propagation. It should be noted that the weight of a panel can vary due to differing weights of materials used, and changes in the method of preparation. Such changes can be implemented to reliably achieve a different weight panel with appropriate quality control steps.

In another example, the method of forming a sheet of building material is practiced by first forming an aqueous pulp slurry having a pH of about 6.5 and comprising approximately 25–35 parts by weight of washed and macerated cellulosic material, approximately 8–14 parts by weight of unmacerated cellulosic material, and approximately 35–40 parts by weight of an expanded rock powder.

The cellulosic material is preferably a newsprint which has been treated with a solution of $H_2SO_4$, $MgSO_4$, or $ZnSO_4$. In one embodiment, the sulfuric acid solution is a waste sulfuric acid solution, such as used battery acid, and preferably comprising about 25–33 wt % sulfuric acid. The expanded powdered rock is preferably vermiculite or pearlite. Next, an aqueous emulsion containing approximately 5 parts by weight of a surfactant selected from the group consisting of stearates, oleates and palmitate is added to the aqueous pulp slurry. The pH of the aqueous pulp slurry is then adjusted to approximately 6.5–7 by adding an aqueous mixture containing approximately 0.5–3.0 parts by weight of aluminum sulphate and 3.0–6.0 parts by weight of magnesium sulphate. Next, 21–50 units by weight of expanded silicates having a particle diameter of about ⅛ of an inch are added, along with approximately 8–16 units by weight of polystyrene grindings. The expanded silicates are formed in this example by dissolving a soluble silicate in an aqueous solution, and then evaporating water from the aqueous solution to form a solid silicate having a moisture content of about 10–20%. The solid silicate is ground and then heated to a temperature sufficient to increase the volume the dried, ground silicate by approximately 5–20 times. In one embodiment of the invention, prior to heating and expanding the solid silicate, about 10% by volume of a metal sulfate powder is added. The dried, ground, expanded silicate is in the form of generally spherical particles having diameters of between about ⅛"–3/16". The pH is then adjusted to about 7.5–8. The aqueous solution is then drained from the slurry. The remaining solid mixture is washed with water having a pH of approximately 7–7.5, and is followed by the addition to the washed solids of approximately 30 units by weight of particulate polystyrene and approximately 75 units by weight of an expanded rock particles. In one embodiment, the mixture of polystyrene and expanded rock particles is produced by dissolving the polystyrene in at least one solvent such as lacquer thinner, xylol, methyl ethyl ketone, methyl chloride, acetone, ethyl acetate or butyl acetate. The expanded rock particles, e.g. pearlite, are then added to the polystyrene/solvent mixture to produce a granular mixture with essentially no free liquid solvent. The solids mixture is then formed into a sheet. The sheet is dewatered using a pressure of at least about 0.5–6.0 psi, and dried at about 180–200 degrees F.

While I have described my invention by reference to the foregoing examples, the invention is not limited thereto. Those skilled in the art will recognize that materials and processing conditions can be varied without departing from the scope and spirit of the following claims, the fullest permissible scope of which is claimed.

I claim:

1. A method of forming a sheet of building material comprising the steps of:

forming an aqueous pulp slurry having a pH of about 6.5 and comprising approximately 25–35 parts by weight of washed and macerated cellulosic material, approximately 8–14 parts by weight of unmacerated cellulosic material, and approximately 35–40 parts by weight of an expanded rock powder;

adding to the aqueous pulp slurry an aqueous emulsion containing approximately 5 parts by weight of a surfactant selected from the group consisting of stearates, oleates and palmitate;

adjusting the pH of the aqueous pulp slurry to approximately 6.5–7 by adding an aqueous mixture containing approximately 0.5–3.0 parts by weight of aluminum sulphate and 3.0–6.0 parts by weight of magnesium sulphate;

adding 21–50 units by weight of expanded silicates having a particle diameter of about ⅛ of an inch;

adding approximately 8–16 units by weight of polystyrene grindings and adjusting the pH to about 7.5–8;

draining the aqueous solution from the slurry;

washing the remaining solid mixture with water having a pH of approximately 7–7.5;

adding to the washed solids approximately 30 units by weight of particulate polystyrene and approximately 75 units by weight of an expanded rock particles;

forming the solids mixture into a sheet and dewatering the sheet using a pressure of at least about 0.5–6.0 psi; and drying the dewatered sheet at about 180–200 degrees F.

2. The method of claim 1 wherein the expanded powdered rock is selected from the group consisting of vermiculite and pearlite.

3. The method of claim 1 wherein the macerated cellulosic material has been treated with a solution containing a sulfurous compound selected from the group consisting of $H_2SO_4$, $MgSO_4$ and $ZnSO_4$.

4. The method of claim 1 wherein the cellulosic material comprises a newsprint.

5. The method of claim 3 wherein the sulfuric acid solution includes a waste sulfuric acid solution.

6. The method of claim 4 wherein the waste sulfuric acid solution comprises about 25–33 wt % sulfuric acid.

7. The method of 3 wherein the waste sulfuric acid solution comprises a battery acid.

8. The method of claim 1 wherein the step of adding to the washed solids approximately 30 units by weight of polystyrene and approximately 75 units by weight of an expanded rock powder wherein the mixture of polystyrene and expanded rock particles is produced by the steps of:

dissolving the polystyrene in at least one solvent selected from the group consisting of lacquer thinner, xylol, methyl ethyl ketone, methyl chloride, acetone, ethyl acetate and butyl acetate, and adding the expanded rock powder to the polystyrene/solvent mixture to produce a granular mixture with essentially no free liquid solvent.

9. The method of claim 8 wherein the expanded rock particles comprise pearlite.

10. The method of claim 1 wherein the expanded silicates are formed by:

dissolving a soluble silicate in an aqueous solution;

evaporating water from the aqueous solution to form a solid silicate;

grinding the solid silicate; and heating the dried, ground silicate to a temperature sufficient to increase the volume the dried, ground silicate by approximately 5–20 times.

11. The method of claim 10 which further comprises the steps of:

evaporating water from the aqueous solution to form a solid silicate having a moisture content of about 10–20%; and adding to the solid silicate, prior to heating and expanding, about volume 10% of a metal sulfate powder.

12. The method of claim 10 wherein the dried, ground, expanded silicate comprises generally spherical particles having diameters of between about ⅛"–3/16".

* * * * *